United States Patent [19]

Suzuki et al.

[11] Patent Number: 5,642,255
[45] Date of Patent: Jun. 24, 1997

[54] CAPACITOR CASE HAVING FLAT COUPLING SECTIONS

[75] Inventors: Nobuji Suzuki, Takaoka; Mitsumasa Oku, Toyono, both of Japan

[73] Assignee: Matsushita Electric Industrial Co., Ltd., Osaka, Japan

[21] Appl. No.: 634,760

[22] Filed: Apr. 19, 1996

[30] Foreign Application Priority Data

Apr. 28, 1995 [JP] Japan ..................... 7-105502

[51] Int. Cl.⁶ .................. H01G 9/08; H01G 9/00
[52] U.S. Cl. .................. 361/535; 361/517; 361/539
[58] Field of Search .................. 361/517, 521, 361/535, 539, 308.2

[56] References Cited

FOREIGN PATENT DOCUMENTS 3234011A 10/1991 Japan .

Primary Examiner—Bot L. Ledynh
Attorney, Agent, or Firm—Watson Cole Stevens Davis P.L.L.C.

[57] ABSTRACT

A hollow cylindrical resin case provided at a periphery thereof with an axial opening and a resin terminal plate, one of which has a concave coupling section and the other has a convex coupling section, are coupled together and then filler resin is injected between the capacitor element attached to the terminal plate and the resin case to provide a seal. One or both of the resin case and the resin terminal plate are made of thermoplastic resin, and a space is defined between the coupling sections. A dimension of the space and an inserting force applied to the coupling portions are set to appropriate values, thereby realizing a high quality capacitor free from leakage of filler resin.

12 Claims, 4 Drawing Sheets

PRIOR ART FIG.5
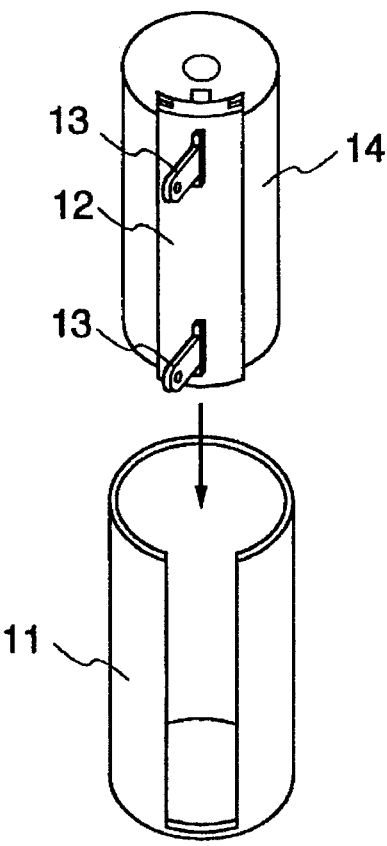
PRIOR ART FIG.6
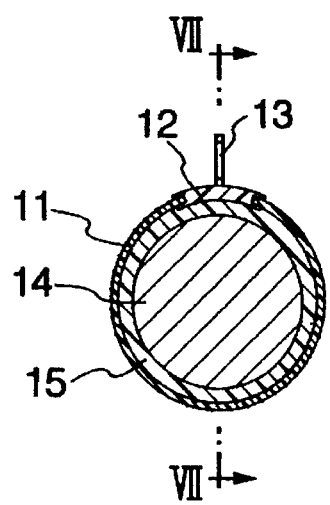
PRIOR ART FIG.7
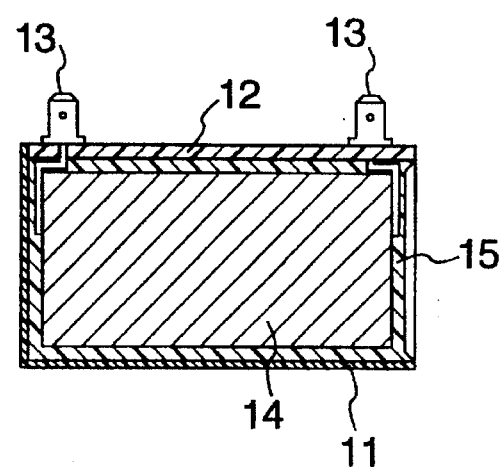

CAPACITOR CASE HAVING FLAT COUPLING SECTIONS

FIELD OF THE INVENTION AND RELATED ART STATEMENT

The present invention relates to a capacitor used in electric, industrial and power supply devices or equipment and so on.

A capacitor used in these devices is mainly a dry type capacitor in which a resin case houses therein a capacitor element and is filled with resin.

An outer case of the capacitor is demanded to have an electrically safe structure as well as a function of protecting the capacitor element against mechanical, physical or chemical environment. Also, in order to ensure a further safety, a flame retardant resin case is usually used as the outer case.

The outer case of the capacitor has many different structures in accordance with the devices in which the capacitors are used and with the purposes of the capacitor. In particular, in the electric and industrial equipment, a handy and compact capacitor is strongly required, and therefore a molded resin case is mainly employed as the outer case of the capacitor.

As disclosed in Japanese Patent Unexamined Publication No. 3-234011, in a conventional capacitor, a resin terminal plate is provided on both edges thereof with axial grooves into which wall edges of a resin case are axially inserted or engaged.

With the above conventional construction, it is possible to prevent the resin terminal plate and a capacitor element from coming off and loosening from the resin case upon injection of filler resin, such as epoxy resin, urethane resin or the like. However, since it is difficult to ensure the accuracy of a coupling section between the groove of the terminal plate and the wall edge of the resin case, it is not possible to absolutely eliminate the leakage of the filler resin from such coupling section.

To solve this problem, an adhesive is applied to the coupling section. However, it is hard to say that it is effective, because an extra member and step are needed. Further, the adhesive of cyanoacrylate or the like is used so as to finish an adhesion operation in a short time period, which adversely affects the environment of the working site.

OBJECT AND SUMMARY OF THE INVENTION

The present invention aims to solve the above-described problems of the prior art. An object of the invention is to provide a capacitor in which a sealing can be made with reliability without using any adhesive or the like while preventing leakage of filler resin.

To this end, according to one aspect of the present invention, there is provided a capacitor which comprises a hollow cylindrical case provided at a periphery thereof with an axial opening, a terminal plate attached to a capacitor element housed in the cylindrical case, the terminal plate being coupled with the cylindrical case, and resin filler injected between the capacitor element and the cylindrical case, wherein one of the coupling sections of the cylindrical case and the terminal plate has a convex shape and the other has a concave shape, and wherein at least either of the coupling sections is made of thermoplastic resin.

Further, according to another aspect of the invention, there is provided a capacitor which comprises a hollow cylindrical case provided at a periphery thereof with an axial opening, a terminal plate attached to a capacitor element housed in the cylindrical case, the terminal plate being coupled with the cylindrical case, and resin filler injected into between the capacitor element and the cylindrical case, wherein one of the coupling sections of the cylindrical case and the terminal plate has a convex shape and the other has a concave shape, and wherein a space is defined between a tip edge of the convex shaped coupling section and bottom edge of the concave shaped coupling section.

BRIEF DESCRIPTION OF THE DRAWINGS

FIG. 5 is a perspective view of a conventional capacitor;

FIG. 6 is a cross sectional view of the capacitor shown in FIG. 5;

FIG. 7 is a cross sectional view taken in the line VII—VII in FIG. 6;

DESCRIPTION OF THE PREFERRED EMBODIMENTS

The embodiments of the present invention are explained hereinafter with reference to the accompanying drawings.

Figure 1:
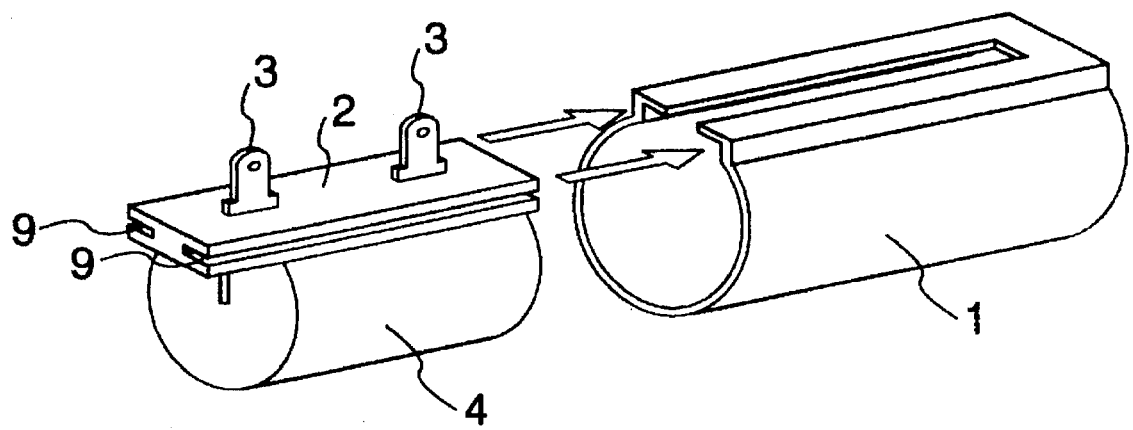
FIG. 1 is a perspective view of a film capacitor according to an embodiment of the present invention.
Figure 2:
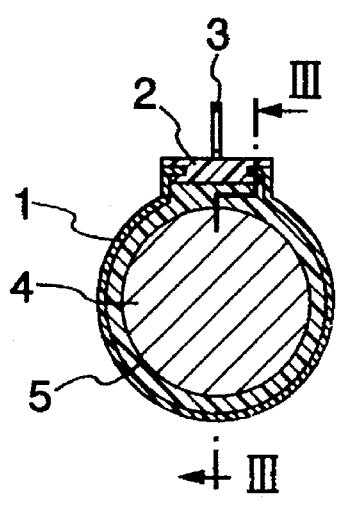
FIG. 2 is a cross sectional view of the capacitor shown in FIG. 1.
Figure 3:
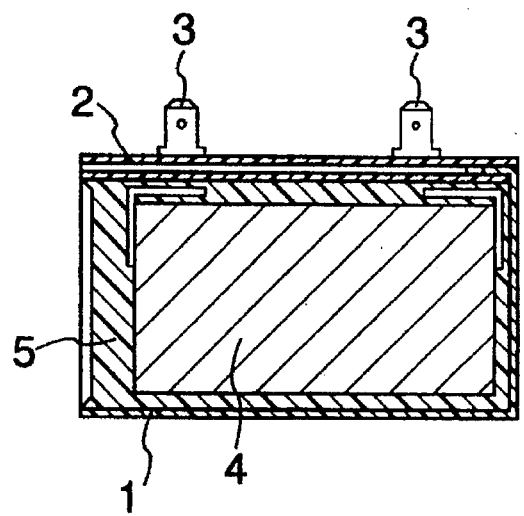
FIG. 3 is a longitudinal sectional view taken in the line III—III in FIG. 2.

In FIGS. 1–3, a film capacitor element 4 is connected to a resin terminal plate 2 through lead wires. The film capacitor element 4 is made of a metallized film. The resin terminal plate 2 has concave slide coupling grooves 9 on both edges. The capacitor element 4 is coupled with a hollow cylindrical resin case 1 in the following manner. The terminal plate 2 is slid to the resin case 1 in a direction of the arrows (FIG. 1) such that the slide coupling grooves 9 engage with wall edges of an opening formed axially in a wall of the resin case 1. After the coupling, filler resin 5 (viscosity: 3–7 poise/25° C.) is injected into a space between the case 1 and the capacitor element 4, and then hardened to complete a film capacitor.

Figure 4:
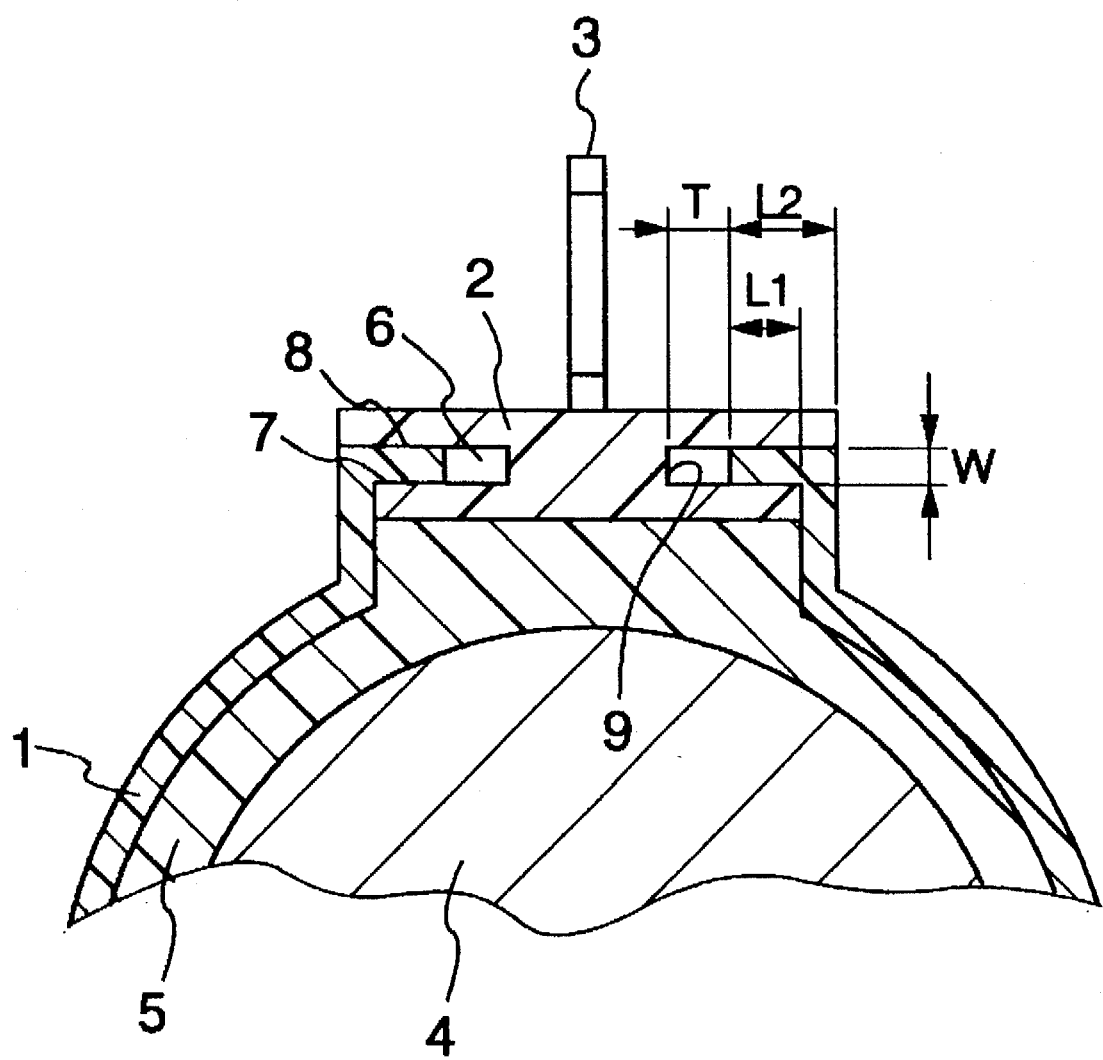
FIG. 4 is an enlarged fragmentary cross sectional view of the capacitor of FIG. 1.

As shown in FIG. 4, the coupling section has spaces 6 as well as two independent contact portions, that is, a first contact portion 7 and a second contact portion 8 disposed radially outward from the first contact portion 7.

In order to obtain an appropriate coupling section which can be produced economically without leakage of filler resin 5, the film capacitors thus constructed of different thickness W of wall edge and of different size T of the space have been tested. The results are shown in Table 1. It should be noted that the resin case 1 and the resin terminal plate 2 used in the test are made of polybutylene terephthalate which is a thermoplastic resin.

TABLE 1

|   |     | T mm |     |     |     |     |     |     |     |
|---|-----|------|-----|-----|-----|-----|-----|-----|-----|
|   |     | 0    | 0.2 | 0.4 | 0.6 | 1.0 | 2.0 | 10  | 20  |
| W | 0.3 | 5    | 4   | 2   | 2   | 1   | 1   | 0   | 0   |
| mm| 0.5 | 5    | 4   | 0   | 0   | 0   | 0   | 0   | 0   |
|   | 0.8 | 4    | 3   | 0   | 0   | 0   | 0   | 0   | 0   |
|   | 1.0 | 4    | 2   | 0   | 0   | 0   | 0   | 0   | 0   |
|   | 3.0 | 4    | 3   | 0   | 0   | 0   | 0   | 0   | 0   |
|   | 5.0 | 3    | 3   | 0   | 0   | 0   | 0   | 0   | 0   |
|   | 7.5 | 4    | 3   | 0   | 0   | 0   | 0   | 0   | 0   |

An integer in Table 1 indicates the number of defects out of five samples, in which leakage of filler resin can be observed.

From the results in Table 1, it is apparent that the leakage protection can be ensured with the coupling section in which $W \geq 0.5$ mm and $T \geq 0.4$ mm. However, in an economical and technical point of view, the coupling section in which 0.5 mm $\leq W \leq 3.0$ mm and 0.5 mm $\leq T \leq 10$ mm is judged to be most appropriate. Further, it is proved that each of lengths $L_1$ and $L_2$ of the contact portions 7 and 8 should not be smaller than 1.0 mm in order to obtain a good coupling section.

Based on the above results, many different combinations of materials for the resin case 1 and the resin terminal plate 2 have been tested. Table 2 shows the results thereof.

TABLE 2

|            |                   | Resin terminal plate |                   |
|------------|-------------------|----------------------|-------------------|
|            |                   | Thermoplastic resin  | Thermosetting resin |
| Resin case | Thermoplastic resin | 0                  | 0                 |
|            | Thermosetting resin | 0                  | 8                 |

An integer in Table 2 indicates the number of defects out of thirty samples, in which leakage of filler resin can be observed. In this examination, the thickness W of the coupling section and the size T of the space are selected to be W=1.0 mm and T=1.0 mm, respectively, which are judged the best combination from the above results shown in Table 1. Further, polybutylene terephthalate is used as the thermoplastic resin, while epoxy resin is used as the thermosetting resin.

As is evident from the results of this test, it is found that either or both of the resin case 1 and the resin terminal plate 2 should be made of the thermoplastic resin.

Table 3 shows the results of a test in which the filler resin leakage can be observed in accordance with the coupling force applied to the coupling section. The test has been carried out under the condition that W=1.0 mm and T=1.0 mm, and both of the resin case 1 and the resin terminal plate 2 are made of polybutylene terephthalate which is a thermoplastic resin.

TABLE 3

| | Inserting force (Kgf) applied to the coupling section | | | | | | | | | | |
|---|---|---|---|---|---|---|---|---|---|---|---|
| | 0.2 | 0.4 | 0.6 | 0.8 | 1.0 | 1.5 | 2.0 | 3.0 | 5.0 | 7.5 | 10.0 |
| Number of defective | 5 | 3 | 1 | 0 | 0 | 0 | 0 | 0 | 0 | 0 | 0 |

An integer in Table 3 indicates the number of defects out of five samples, in which leakage of filler resin can be observed.

As is apparent from the results of this test, if the inserting force applied at the time of slide coupling is not smaller than 0.8 Kgf, it becomes possible to make the resin seal complete. However, if the inserting force exceeds 7.5 Kgf, the resin case 1 or the resin terminal plate 2 is deformed by stress, which makes the slide coupling operation difficult. In order to ensure both prevention of leakage of injected filler resin and workability, it is most effective to set the inserting force applied at the time of slide coupling to be between 1.0 Kgf and 5.0 Kgf.

As to an attachment of drawing fittings 3 to the terminal plate 2, it has been generally adopted that insertion holes are formed in the molded resin terminal plate 2 and then the fittings 3 are inserted into such holes, through which the capacitor element is to be drawn out from the case. However, in this embodiment of the present invention, it is preferable to integrate the fittings 3 with the terminal plate 2 simultaneously with molding of the terminal plate 2.

Now, operation of the present invention will be described hereinafter in detail.

In FIG. 4, the injected filler resin 5 tends to penetrate the first contact portion 7 between the resin case 1 and the resin terminal plate 2. The penetrating force at this time is attributed to capillary action due to a specific contact angle, which is peculiar to the filler resin 5, and the self-weight of the filler resin 5. If the accuracy of the dimensions of the first contact portion 7 is obtained and then a higher seal is secured, the filler resin 5 is sealed up by the first contact portion 7. However, when a sufficient seal is not secured at the first contact portion 7, the filler resin 5 penetrates into the space 6 to reach the second contact portion 8. However, the space 6 is an independent or separate space defined by the first and the second contact portions 7 and 8 and therefore the resin penetrated in the space 6 is not applied with the self-weight of the filler resin 5. For this reason, the filler resin 5 arrived at the second contact portion 8 has a penetrating force attributable only to the capillary action due to contact angle of the resin 5. In addition, the amount of the filler resin 5 reaching the second contact portion 8 is very small. Accordingly, there is no possibility that the filler resin 5 flows out beyond the contact portion 8, and therefore the resin seal can be made with reliability.

Further, the resin case 1 and/or the resin terminal plate 2 is made of thermoplastic resin, the seals in the first and the second contact portions 7 and 8 are enhanced due to flexibility of such thermoplastic resin. Accordingly the filler resin 5 is prevented from penetrating, with the result that the possibility of leakage of the filler resin 5 is further lessened. In view of this, it is preferable that the resin case 1 is made of thermoplastic resin, for example, polybutylene terephthalate (containing 20%–35% GF), while the resin terminal plate 2 is also made of thermoplastic resin, for example, nylon 6 ("TORAY 1014" manufactured by Toray Industry, Inc.).

In the above embodiment, the resin case 1 and the resin terminal plate 2 are made of polybutylene terephthalate as the thermoplastic resin and epoxy resin as the thermosetting resin, respectively. However, the thermoplastic resin is not limited to polybutylene terephthalate, but other resin such as polyethylene terephthalate, polycarbonate, polyphenylene oxide, and nylon may be used as a material of resin case 1. Further, the thermosetting resin is not limited to epoxy resin, but other resin such as phenol, and unsaturated polyester, which is generally used for the resin sealed capacitor, may be used as a material of resin terminal plate 2.

Further, in the above embodiment, the resin case 1 is provided with the axial convex portion and the resin terminal plate 2 is provided with the coupling grooves 9. However it goes without saying that alternating such provision is possible.

Figure 8:
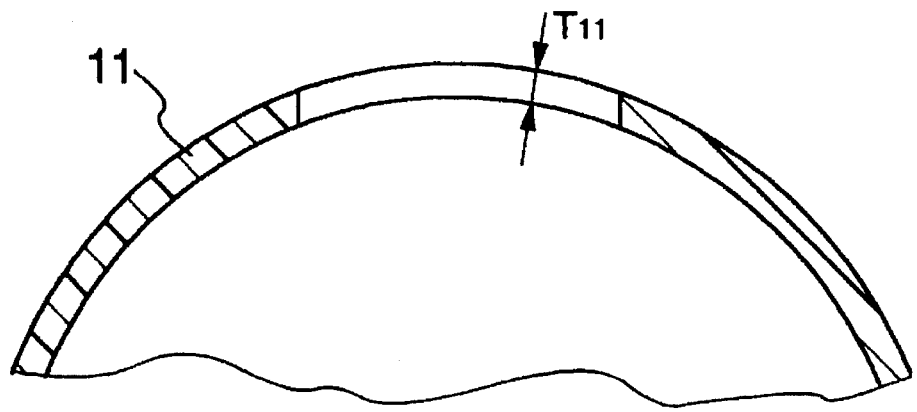
FIG. 8 is an enlarged fragmentary cross sectional view of coupling portions of a resin case of the capacitor shown in FIG. 5.
Figure 9:
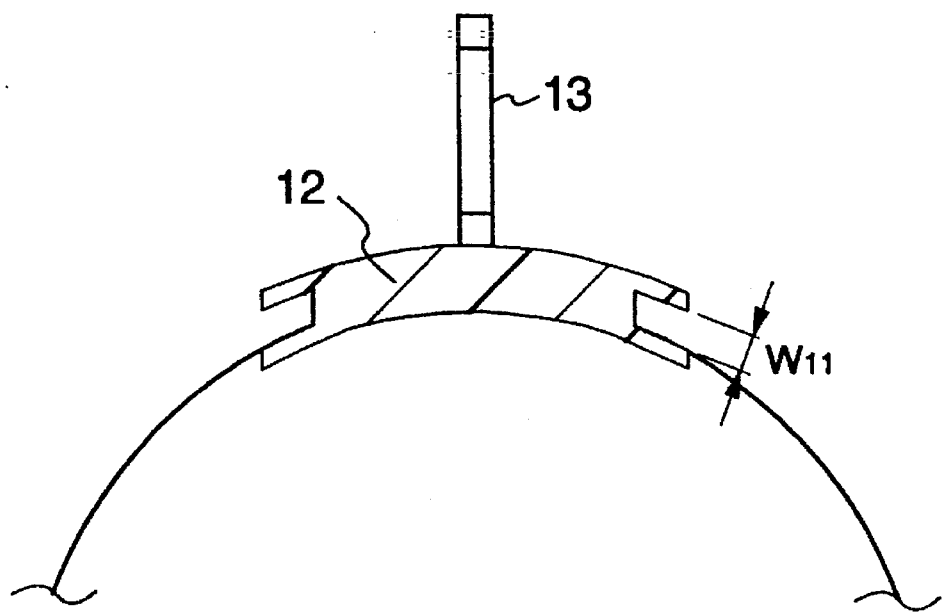
FIG. 9 is an enlarged fragmentary cross sectional view of coupling portions of a capacitor element of the capacitor shown in FIG. 5.

On the other hand, with a conventional construction shown in FIGS. 5–9, it is possible to prevent a resin terminal plate 12 and a capacitor element 14 from coming off and loosening from the resin case 11 during the injection of filler resin 15 such as epoxy resin, and urethane resin, but it is impossible to absolutely eliminate the leakage of the filler resin 15 because it is difficult to secure the accuracy of the size $W_{11}$ and the thickness $T_{11}$ under the condition of $W_{11} \geq T_{11}$ (FIGS. 8 and 9).

As is apparent from the above description, in the capacitor of the present invention, owing to the flexibility of the thermoplastic resin, the sealing ability of the coupling portions is enhanced to prevent the penetration of the filler resin. Further, there are two independent or separate sealing portions, namely a double-blocking system for leakage. Therefore, even if the filler resin penetrates into the space between the sealing portions, since the weight of the filler resin in the resin case cannot apply to the resin in such space, it is accordingly possible to prevent the filler resin from leaking outside.

Moreover, by adjusting the size of the space and the inserting force of the resin terminal plate, it is possible to provide a higher quality capacitor with higher reliability in respect of the leakage of filler resin.

What is claimed is:

1. A capacitor, comprising:

a hollow cylindrical case provided at a periphery thereof with an axial opening and having a coupling section;

a terminal plate attached to a capacitor element housing in said cylindrical case and having a coupling section, said terminal plate being coupled with said cylindrical case by said coupling sections; and resin filler injected between said capacitor element and said cylindrical case, wherein one of said coupling sections of said cylindrical case and said terminal plate has a convex shape and the other has a concave shape, and wherein at least one of said coupling sections is made of thermoplastic resin, wherein said coupling sections extend flat.

2. A capacitor according to claim 1, wherein said terminal plate is coupled with said cylindrical case by means of sliding said terminal plate into said cylindrical case under an inserting force of 1.0 Kgf–5.0 Kgf.

3. A capacitor according to claim 1, wherein a drawing fitting is formed integrally with said terminal plate by means of insertion process.

4. A capacitor according to claim 2, wherein a drawing fitting is formed integrally with said terminal plate by means of insertion process.

5. A capacitor, comprising:

a hollow cylindrical case provided at a periphery thereof with an axial opening and having a coupling section;

a thermal plate attached to a capacitor element housed in said cylindrical case and having a coupling section, said thermal plate being coupled with said cylindrical case by said coupling sections; and resin filler injected between said capacitor element and said cylindrical case, wherein one of said coupling sections of said cylindrical case and said terminal plate has a convex shape and the other has a concave shape, and wherein a space is defined between a tip edge of said convex-shaped coupling section and a bottom edge of said concave-shaped coupling section, wherein said coupling sections extend flat.

6. A capacitor according to claim 5, wherein a radial dimension of said concave shape is in a range of 0.5 mm–3.0 mm, and a diametrical dimension of said space is in a range of 0.5 mm–10 mm.

7. A capacitor according to claim 6, wherein said terminal plate is coupled with said cylindrical case by means of sliding said terminal plate into said cylindrical case under an inserting force of 1.0 Kgf–5.0 Kgf.

8. A capacitor according to claim 6, wherein a drawing fitting is formed integrally with said terminal plate by means of insertion process.

9. A capacitor according to claim 7, wherein a drawing fitting is formed integrally with said terminal plate by means of insertion process.

10. A capacitor according to claim 5, wherein said terminal plate is coupled with said cylindrical case by means of sliding said terminal plate into said cylindrical case under an inserting force of 1.0 Kgf–5.0 Kgf.

11. A capacitor according to claim 10, wherein a drawing fitting is formed integrally with said terminal plate by means of insertion process.

12. A capacitor according to claim 5, wherein a drawing fitting is formed integrally with said terminal plate by means of insertion process.

* * * * *